United States Patent [19]

Shyu et al.

[11] Patent Number: 5,825,367
[45] Date of Patent: Oct. 20, 1998

[54] APPARATUS FOR REAL TIME TWO-DIMENSIONAL SCALING OF A DIGITAL IMAGE

[75] Inventors: Rong-Fuh Shyu, Hsinchu; Feng-Ling Chang, Taipei Hsien, both of Taiwan

[73] Assignee: Winbond Electronics Corp., Hsinchu, Taiwan

[21] Appl. No.: 685,341

[22] Filed: Jul. 23, 1996

Related U.S. Application Data

[63] Continuation-in-part of Ser. No. 507,755, Jul. 26, 1995, Pat. No. 5,621,870.
[51] Int. Cl.$^6$ ....................................................... G06T 3/00
[52] U.S. Cl. ................................................................. 345/439
[58] Field of Search .................................... 395/133–139; 345/433–439

[56] References Cited

U.S. PATENT DOCUMENTS 5,384,912  1/1995  Ogrinc et al. ............................ 395/114

FOREIGN PATENT DOCUMENTS

| 0 574 245 A2 | 12/1993 | European Pat. Off. . |
| 0 595 301 A2 | 5/1994 | European Pat. Off. . |
| 0 367 418 A2 | 5/1990 | WIPO . |
| WO 90/16035 | 12/1990 | WIPO . |

*Primary Examiner*—Almis R. Jankus
*Attorney, Agent, or Firm*—Christensen O'Connor Johnson & Kindness PLLC

[57] ABSTRACT

An apparatus is used to process an original digital image to obtain a uniformly scaled desired digital image, the original digital image having a number (N) of successive original image data while the desired digital image has a number (M) of successive desired image data. When (M) is greater than (N), linear interpolation of (n)th and (n+1)th ones of the original image data is performed to produce a residual interpolated image data inserted therebetween when division of (M−N) by (N−1) results in a remainder (S) and when (n) is a minimum number which meets a condition (n+1)*(S) $\geq$(s)*(N), wherein (s) ranges from 1 to (S). When (M) is less than (N), an address generator controls a memory to output selected ones of the original image data. A succeeding original image data outputted by the memory is offset from an immediately preceding original image data outputted thereby by a number (V) or by a number (V+1), the number (V) being equal to a quotient that results from division of (N) by (M).

16 Claims, 11 Drawing Sheets

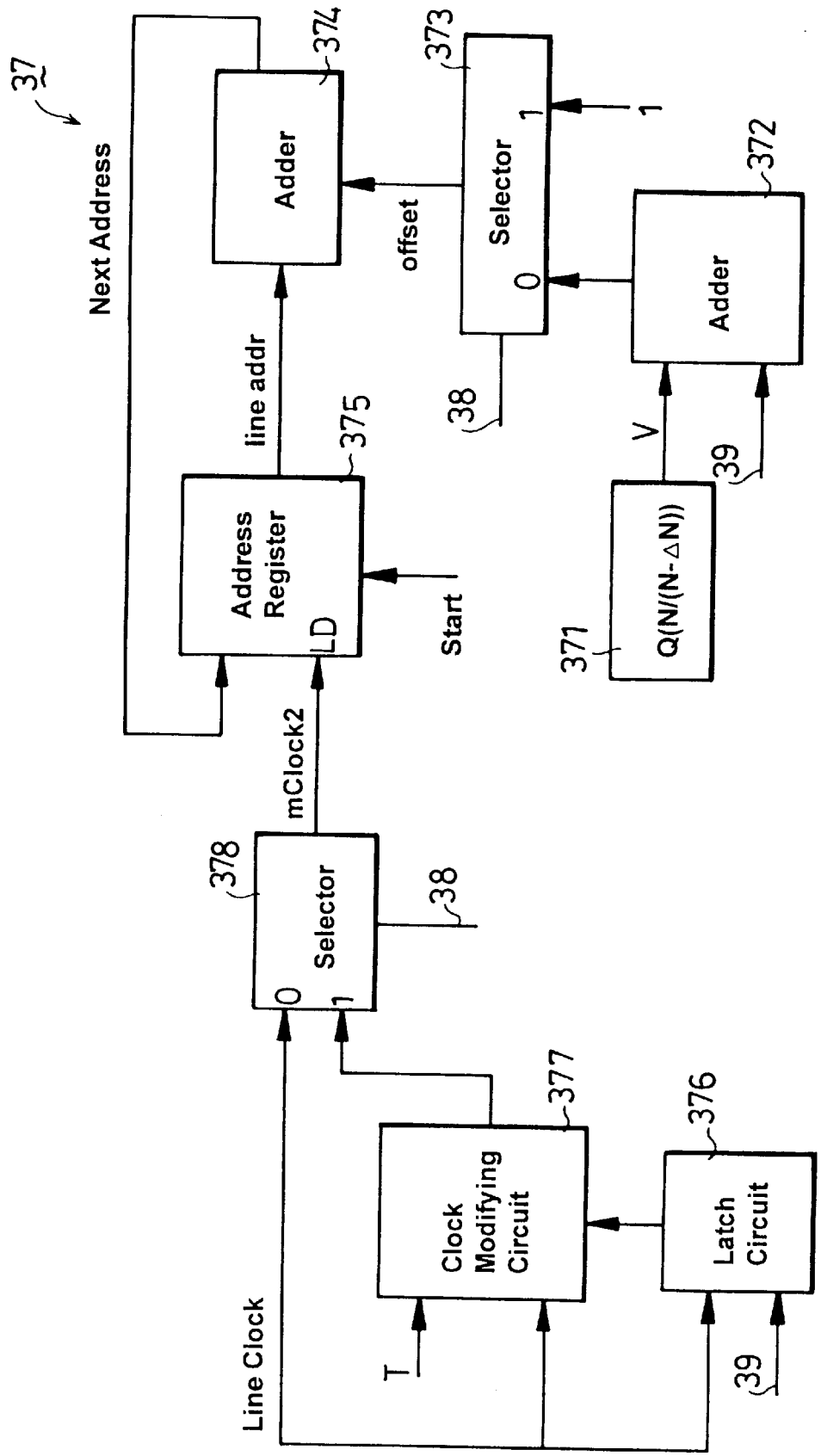
F I G. 6

N = 5; ΔN = 6; INC/DEC = Logic 1
S = 2; T = 1

APPARATUS FOR REAL TIME TWO-DIMENSIONAL SCALING OF A DIGITAL IMAGE

CROSS-REFERENCE TO RELATED APPLICATION

This application is a continuation-in-part (CIP) of U.S. patent application Ser. No. 08/507,755, filed on Jul. 26, 1995 now U.S. Pat. No. 5,621,870 by the applicant.

BACKGROUND OF THE INVENTION

1. Field of the Invention

The invention relates to an image processing apparatus, more particularly to an apparatus capable of real-time two-dimensional uniform scaling of a digital image.

2. Description of the Related Art

The ability to combine digital images is of utmost importance in computer multi-media applications. Usually, a digital image is preprocessed before it can be combined with another digital image. Preprocessing is normally accomplished by increasing the size of the digital image (hereinafter referred to as scaling-up), reducing the size of the digital image (hereinafter referred to as scaling-down), cutting a selected portion of the digital image, shifting the selected portion of the digital image to another location, etc.

Scaling-up and scaling-down of digital images are usually accomplished by a specially-programmed computer. Scaling-up is achieved by performing linear interpolation of every two scan lines of the digital image to obtain at least one interpolated scan line that is inserted therebetween, and by performing linear interpolation of every two pixel data of each scan line to obtain at least one interpolated pixel data that is inserted therebetween. Scaling-down is achieved by deleting some of the scan lines of the digital image, and by deleting some of the pixel data of each of the retained scan lines.

In the scaling-up of digital images, linear interpolation of original image data by the computer is relatively slow. Thus, various dedicated hardware devices have been developed to permit real-time scaling-up of digital images.

Unfortunately, most of these dedicated hardware devices are only capable of scaling-up digital images to a limited extent. When scaling-up a digital image with (N) scan lines, the total number of scan lines to be interpolated must be a multiple of (N−1) so as to permit insertion of an equal number of interpolated scan lines between every two of the original scan lines of the original digital image in order to maintain uniformity. The same is true when scaling-up a scan line with (N') pixel data.

Presently, two-dimensional scaling of a digital image can be achieved with the use of a special graphics processor to perform variable expansion and shrinkage of the image, or with the use of a dedicated hardware device to achieve the same result. Initially, the original image is stored in a frame memory. The original image is then scaled in a first dimension, and the resulting one-dimensional scaled image is stored in the frame memory. The scaled image is then scaled in a second dimension, and the resulting two-dimensional scaled image is stored in the frame memory before being provided to an output device, such as a computer display or printer. The conventional scaling methods are not cost effective in view of their relatively large memory requirement, especially when a large magnification ratio is in use. In addition, the conventional scaling methods employ a large number of processing stages and thus have a relatively poor efficiency since the one-dimensional scaled image has to be stored in the frame memory before it can be scaled in the second dimension, and since the two-dimensional scaled image should be stored in the frame memory before it can be provided to the output device. Thus, the conventional scaling methods are not suitable for use in live video applications.

SUMMARY OF THE INVENTION

Therefore, the object of the present invention is to provide an apparatus which is capable of real-time two-dimensional uniform scaling of a digital image.

More specifically, the object of the present invention is to provide a cost effective and highly efficient scaling apparatus suitable for use in live video applications.

According to the present invention, an apparatus is capable of processing an original digital image to obtain a uniformly scaled desired digital image. The apparatus includes a frame memory for storing the original digital image therein. The original digital image has a number (N) of successive original scan lines and a number (N') of successive original pixel data per original scan line. The apparatus further includes a vertical scaling unit for scaling the original digital image in a vertical direction to obtain a number (M) of successive desired scan lines, and a horizontal scaling unit for scaling the desired scan lines from the vertical scaling unit in a horizontal direction to obtain a number (M') of successive desired pixel data per scan line.

In order for the vertical scaling unit to scale the original digital image when the number (M) is greater than the number (N), the vertical scaling unit includes: a line memory connected to the frame memory for storing an (n+1)th one of the original scan lines from the frame memory therein; a line buffer connected to the line memory for storing an (n)th one of the original scan lines therein; a first linear interpolator connected to the line memory and the line buffer; and a vertical scaling controller connected to the frame memory, the line buffer and the first linear interpolator. The vertical scaling controller controls the storage of the original scan lines in the line memory and the line buffer, and further controls the first linear interpolator to perform a linear interpolation of the (n)th and (n+1)th ones of the original scan lines from the line memory and the line buffer to produce a residual interpolated scan line inserted therebetween when division of (M−N) by (N−1) results in a remainder (S) and when (n) is a minimum number which meets a condition $(n+1)*(S) \geq (s)*(N)$, wherein (s) ranges from 1 to (S).

In order for the vertical scaling unit to scale the original digital image when the number (M) is less than the number (N), the vertical scaling controller includes: a first address generator, connected to the frame memory, for controlling the frame memory to output a first one of the original scan lines for storage in the line memory; first generating means for generating a number (U), which is a remainder that results from division of the number (N) by the number (M); a first data register; first adder means, connected to the first generating means and the first data register, for adding the number (U) and the number stored in the first data register to obtain a sum; and first computing means, connected to the first adder means, the first address generator and the first data register, for comparing the sum with the number (M) and for activating the first address generator to control the frame memory to output another one of the original scan lines for storage in the line memory, said another one of the original scan lines being offset from an immediately preceding original scan line outputted by the frame memory by a number (V) equal to a quotient that results from the division of the number (N) by the number (M) when the sum is less than the number (M), and by a number (V+1) when the sum is at least equal to the number (M). The first computing means stores the difference of the number (M) and the sum in the first data register when the sum is at least equal to the number (M), and stores the sum in the first data register when the sum is less than the number (M).

In order for the horizontal scaling unit to scale the desired scan lines from the vertical scaling unit when the number (M') is greater than the number (N'), the horizontal scaling unit includes: a dot register connected to the first linear interpolator for storing an (n'+1)th one of the pixel data of one of the scan lines from the first linear interpolator therein; a dot buffer connected to the dot register for storing an (n')th one of the pixel data of said one of the scan lines therein; a second linear interpolator connected to the dot register and the dot buffer; and a horizontal scaling controller connected to the line memory, the line buffer, the dot buffer and the second linear interpolator. The horizontal scaling controller controls the storage of the pixel data in the dot register and the dot buffer, and further controls the second linear interpolator to perform a linear interpolation of the (n')th and (n'+1)th ones of the pixel data from the dot register and the dot buffer to produce a residual interpolated pixel data inserted therebetween when division of (M'−N') by (N'−1) results in a remainder (S') and when (n') is a minimum number which meets a condition (n'+1)*(S')≧(s')*(N'), wherein (s') ranges from 1 to (S').

In order for the horizontal scaling unit to scale the desired scan lines from the vertical scaling unit when the number (M') is less than the number (N'), the horizontal scaling controller includes: a second address generator, connected to the line memory, for controlling the line memory to output a first one of the original pixel data of one of the original scan lines; second generating means for generating a number (U'), which is a remainder that results from division of the number (N') by the number (M'); a second data register; second adder means, connected to the second generating means and the second data register, for adding the number (U') and the number stored in the second data register to obtain a sum; and second computing means, connected to the second adder means, the second address generator and the second data register, for comparing the sum with the number (M') and for activating the second address generator to control the line memory to output another one of the original pixel data of said one of the original scan lines, said another one of the original pixel data of said one of the original scan lines being offset from an immediately preceding original pixel data outputted by the line memory by a number (V') equal to a quotient that results from the division of the number (N') by the number (M') when the sum is less than the number (M'), and by a number (V'+1) when the sum is at least equal to the number (M'). The second computing means stores the difference of the number (M') and the sum in the second data register when the sum is at least equal to the number (M'), and stores the sum in the second data register when the sum is less than the number (M').

The output of the second linear interpolator of the horizontal scaling unit can be provided directly to an output device.

BRIEF DESCRIPTION OF THE DRAWINGS

Other features and advantages of the present invention will become apparent in the following detailed description of the preferred embodiment, with reference to the accompanying drawings, of which:

FIG. 6 is a schematic circuit block diagram of an address generator of the vertical scaling controller;

DETAILED DESCRIPTION OF THE PREFERRED EMBODIMENT

Figure 1:
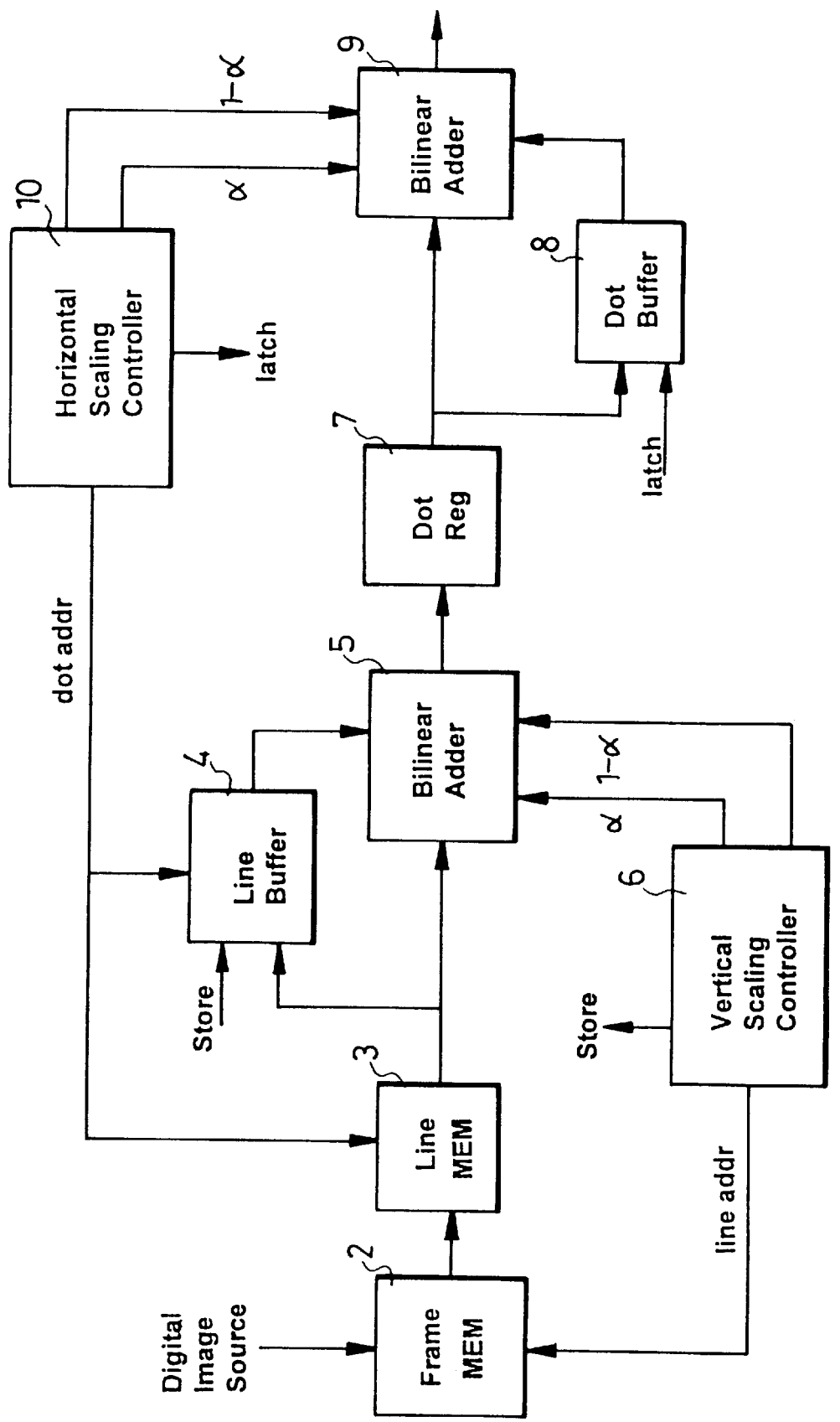
FIG. 1 is a schematic circuit block diagram of the preferred embodiment of a scaling apparatus according to the present invention.

Referring to FIG. 1, the preferred embodiment of an apparatus for uniformly scaling a digital image in accordance with the present invention is shown to comprise a vertical scaling unit and a horizontal scaling unit. The vertical scaling unit is capable of scaling-up or scaling-down a digital image in a vertical direction and includes a line memory 3, a line buffer 4, a bilinear adder 5 and a vertical scaling controller 6. The horizontal scaling unit is capable of scaling-up or scaling-down a digital image in a horizontal direction and includes a dot register 7, a dot buffer 8, a bilinear adder 9 and a horizontal scaling controller 10.

In use, a digital image to be processed with the use of the apparatus of the preferred embodiment is initially stored in a frame memory 2. The digital image may be from an image decoder or an image capturing system. The vertical scaling controller 6 controls the frame memory 2 to provide a selected scan line of the digital image to the line memory 3. The vertical scaling controller 6 further controls the line buffer 4 to store a previous scan line from the line memory 3 therein. The bilinear adder 5 receives scan line data from the line memory 3 and the line buffer 4, and performs bilinear interpolation according to a pair of weighing coefficients α, 1-α from the vertical scaling controller 6.

The output of the bilinear adder 5 is received by the dot register 7. The horizontal scaling controller 10 controls the dot buffer 8 to store a previous pixel data from the dot register 7 therein. The bilinear adder 9 receives pixel data from the dot register 7 and the dot buffer 8, and performs bilinear interpolation according to a pair of weighing coefficients α, 1-α from the horizontal scaling controller 10.

Figure 2:
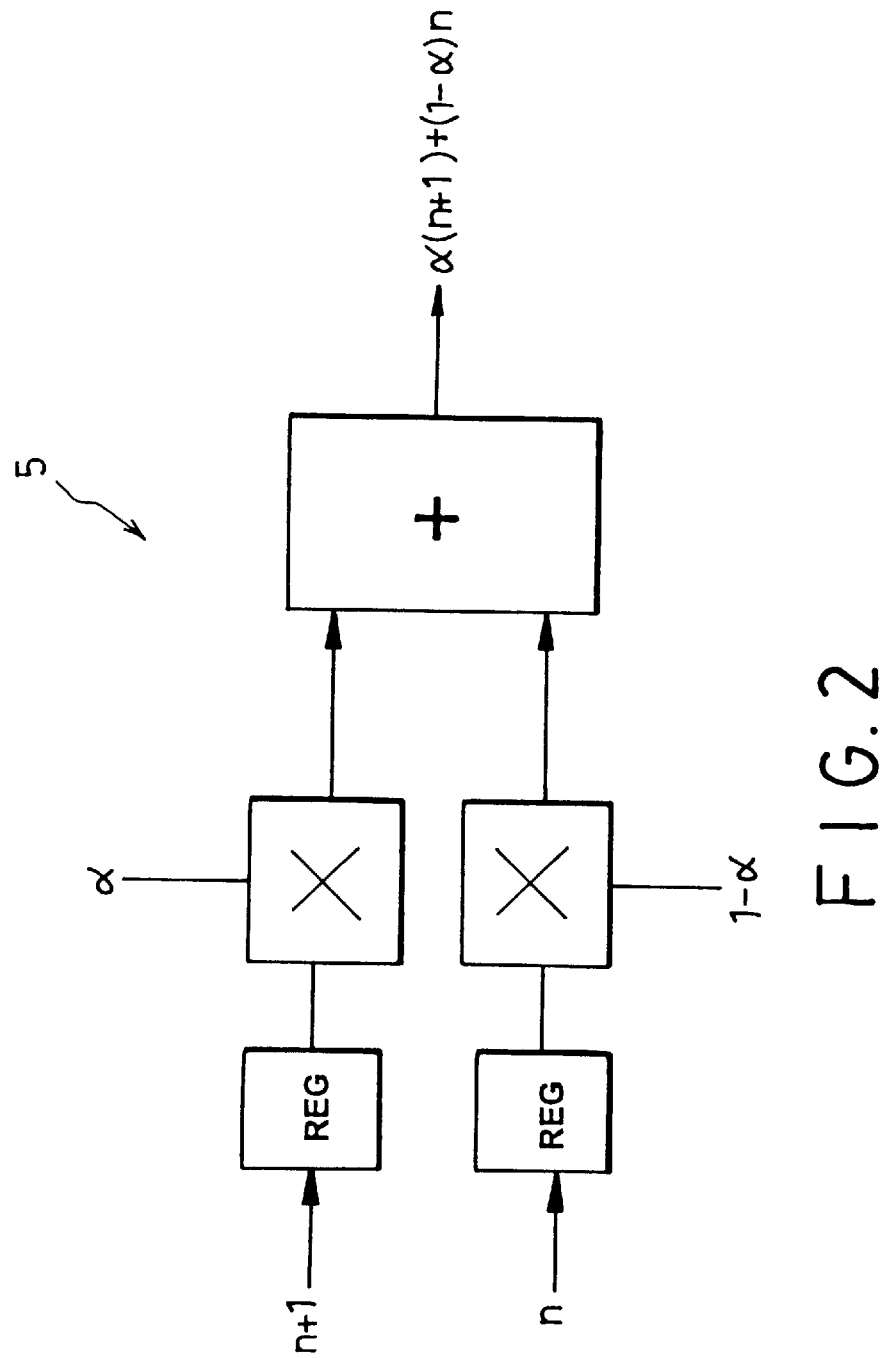
FIG. 2 is a schematic circuit block diagram of a bilinear adder of the preferred embodiment.

FIG. 2 is a schematic circuit block diagram of the bilinear adder 5. As shown, scan line data from the line buffer 4, which corresponds to an (n)th scan line of the digital image in the frame memory 2, is multiplied by the coefficient 1-α, while scan line data from the line memory 3, which corresponds to an (n+1)th scan line of the digital image in the frame memory 2, is multiplied by the coefficient α. The resulting products are then added to obtain an interpolated scan line when the coefficient a is a fraction, i.e. not equal to 0 or 1. The operation of the bilinear adder 5 will be described in greater detail in the succeeding paragraphs.

The structure of the bilinear adder 9 is similar to that of the bilinear adder 5 shown in FIG. 2. In the bilinear adder 9, however, pixel data from the dot buffer 8, which corresponds to an (n')th pixel data of the scan line data from the bilinear adder 5, is multiplied by the coefficient 1-α, while pixel data from the dot register 7, which corresponds to an (n'+1)th pixel data of the scan line data from the bilinear adder 5, is multiplied by the coefficient α. Thus, the dot register 7 is equivalent to the line memory 3 of the vertical scaling unit, while the dot buffer 8 is equivalent to the line buffer 4 of the vertical scaling unit.

Figure 3:
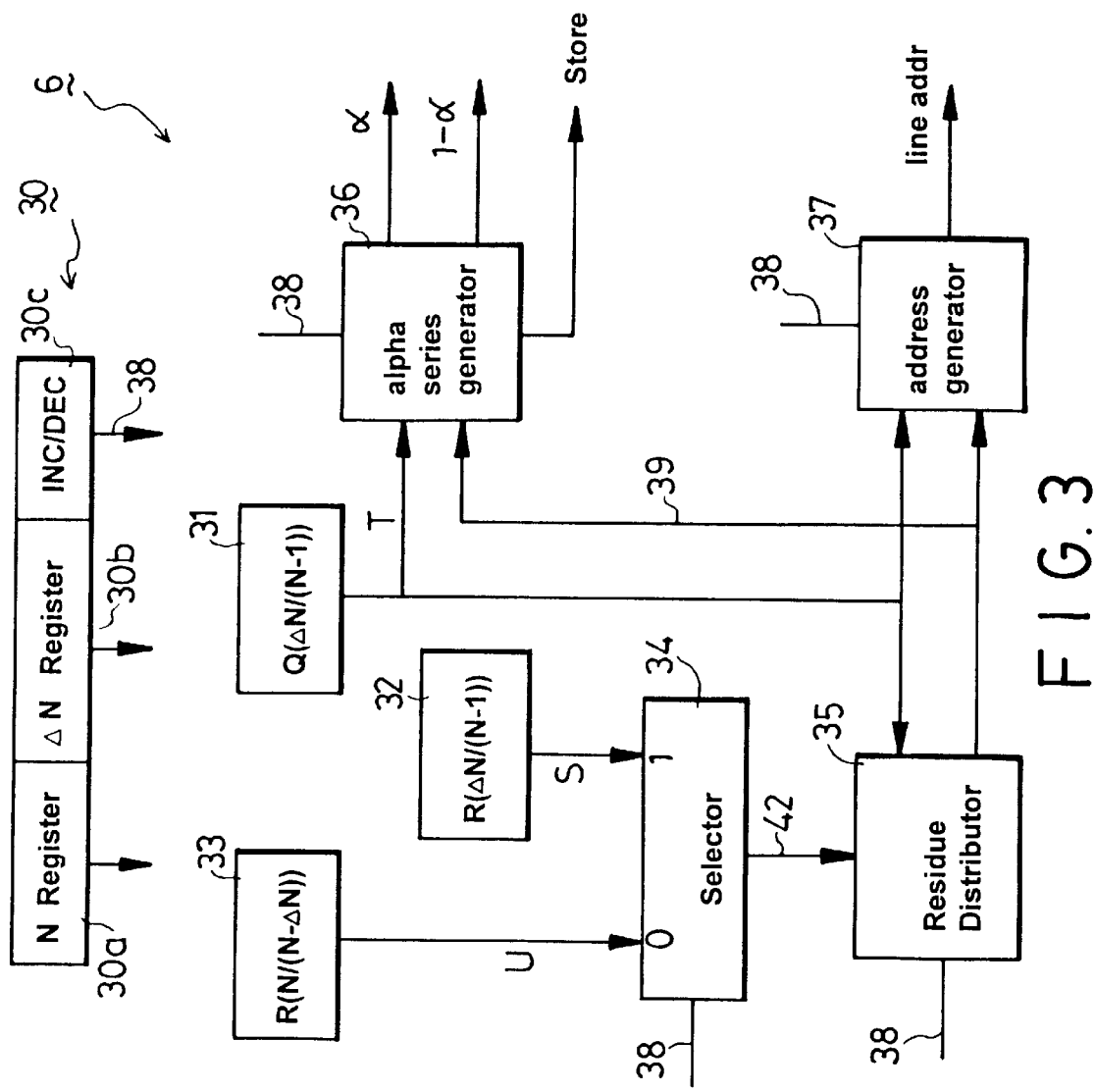
FIG. 3 is a schematic circuit block diagram of a vertical scaling controller of the preferred embodiment.

Referring to FIG. 3, the vertical scaling controller 6 is shown to comprise a programmable register set 30 which includes a first register 30a for storing the number (N) of original scan lines of the digital image in the frame memory 2, a second register 30b for storing the number (▲N) of scan lines to be interpolated or deleted, and a third register 30c for storing an INC/DEC flag 38 that is used to indicate whether scaling-up or scaling-down of the digital image in a vertical direction is to be performed. The vertical scaling controller 6 further includes first, second and third computing circuits 31, 32, 33 which read the contents of the first, second and third registers 30a, 30b, 30c. The first computing circuit 31 outputs a quotient T resulting from division of (▲N) by (N-1), while the second computing circuit 32 outputs a remainder S resulting from the division of (▲N) by (N-1). The quotient T corresponds to the minimum number of interpolated scan lines to be inserted between every two original scan lines of the digital image stored in the frame memory 2, while the remainder S corresponds to the total number of residual interpolated scan lines to be distributed uniformly among the original scan lines of the digital image stored in the frame memory 2 when the digital image is scaled-up. The third computing circuit 33 outputs a remainder U resulting from division of (N) by (N-▲N). The remainder U corresponds to the total number of residual scan lines to be deleted from the digital image stored in the frame memory 2 when the digital image is scaled-down.

A two-input selector 34 has a first input which receives the remainder U from the third computing circuit 33 and a second input which receives the remainder S from the second computing circuit 32. The selector 34 further has a control input which receives the INC/DEC flag 38 from the third register 30c. The output 42 of the selector 34 is received by a residue distributor 35. The residue distributor 35 further receives the quotient T from the first computing circuit 31, and has a control input which receives the INC/DEC flag 38 from the third register 30c, and a control output 39 which is connected to an alpha series generator 36 and an address generator 37. The residue distributor 35 determines when a residual interpolation step is to be performed during scaling-up of the digital image and when a residual scan line is to be deleted during scaling-down of the digital image. The alpha series generator 36 receives the quotient T from the first computing circuit 31 and the INC/DEC flag 38 from the third register 30c, and generates the coefficients α, 1-α for the bilinear adder 5 and a store command signal for the line buffer 4 (see FIG. 1). The address generator 37 also receives the quotient T from the first computing circuit 31 and the INC/DEC flag 38 from the third register 30c, and provides line address data to the frame memory 2.

Figure 4:
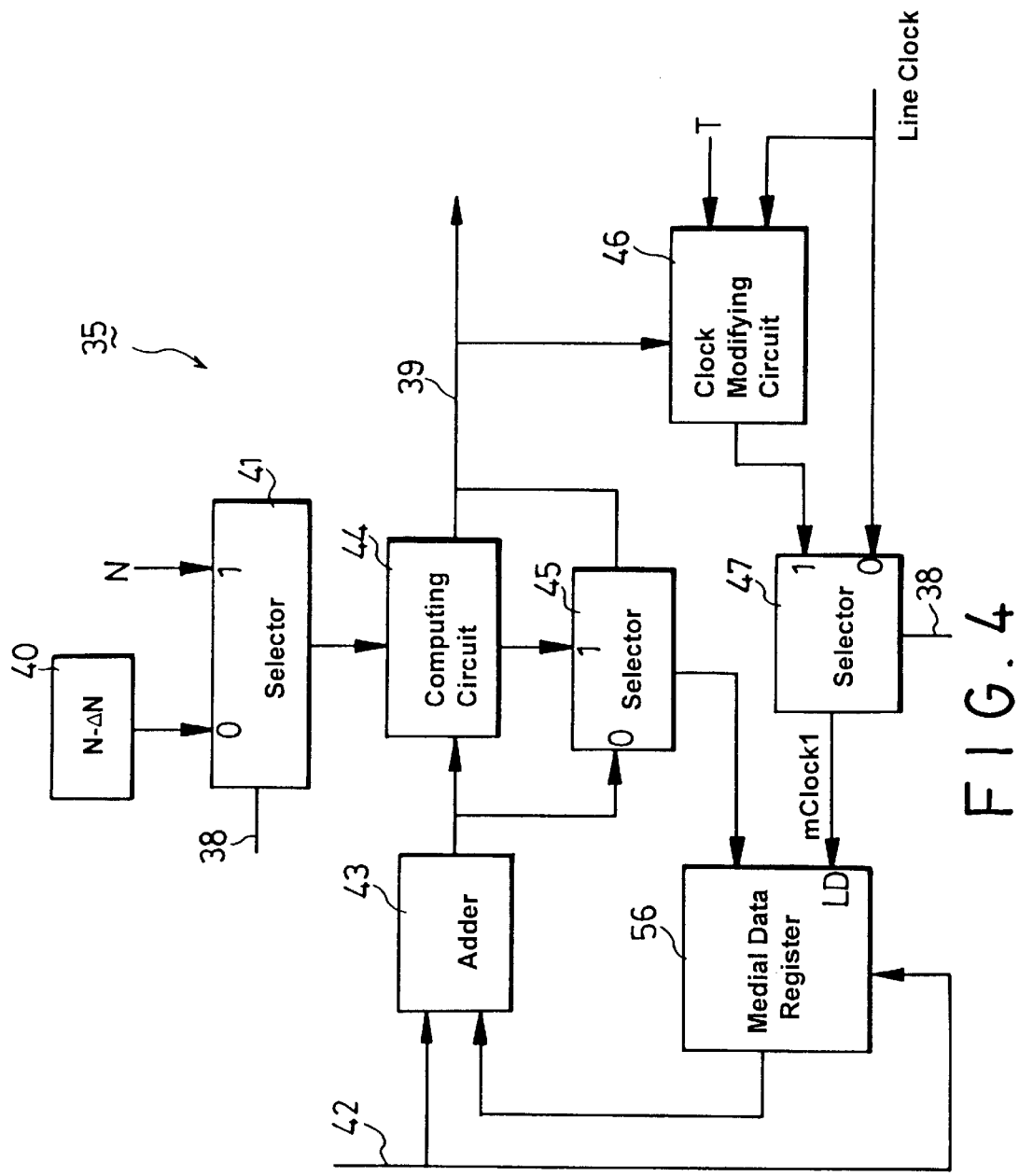
FIG. 4 is a schematic circuit block diagram of a residue distributor of the vertical scaling controller.

Referring to FIG. 4, the residue distributor 35 comprises a computing circuit 40 which outputs the difference of (N) and (▲N), and a two-input selector 41 which has a first input that receives the output of the computing circuit 40, a second input that receives the number (N) from the first register 30a, and a control input that receives the INC/DEC flag 38 from the third register 30c. A medial data register 56 receives the output 42 of the selector 34 (see FIG. 3) and has an output connected to one of the inputs of a two-input adder 43. The other input of the adder 43 receives the output 42 of the selector 34. The output of the adder 43 and the output of the selector 41 serve as inputs to a computing circuit 44 which deducts the latter from the former and which generates an enable signal at a control output 39 thereof when the output of the adder 43 is larger than or equal to the output of the selector 41. A two-input selector 45 has a first input that receives the output of the adder 43, a second input that receives the difference of the outputs of the adder 43 and the selector 41 from the computing circuit 44, a control input that is connected to the control output 39 of the computing circuit 44, and an output that is connected to the medial data register 56.

A clock modifying circuit 46 receives the original input line clock and modifies the latter in accordance with the signal at the control output 39 and the quotient T from the first computing circuit 31. The original input line clock may be the display scan line clock such that the vertical scaling operation can be achieved on the way the original image data is being outputted for display on an output device, such as a printer or computer display. When the control output 39 is in a logic high state, the clock modifying circuit 46 outputs a divide-by-(T+2) clock that has a duration of (T+2) times of the original input line clock. When the control output 39 is in a logic low state, the clock modifying circuit 46 outputs a divide-by-(T+1) clock that has a duration of (T+1) times of the original input line clock. The output of the clock modifying circuit 46 and the original input line clock serve as inputs to a selector 47. The INC/DEC flag 38 from the third register 30c serves as the control input of the selector 47. The medial data register 56 has a load pin LD that receives a clock signal mclock1 from the selector 47.

Figure 5:
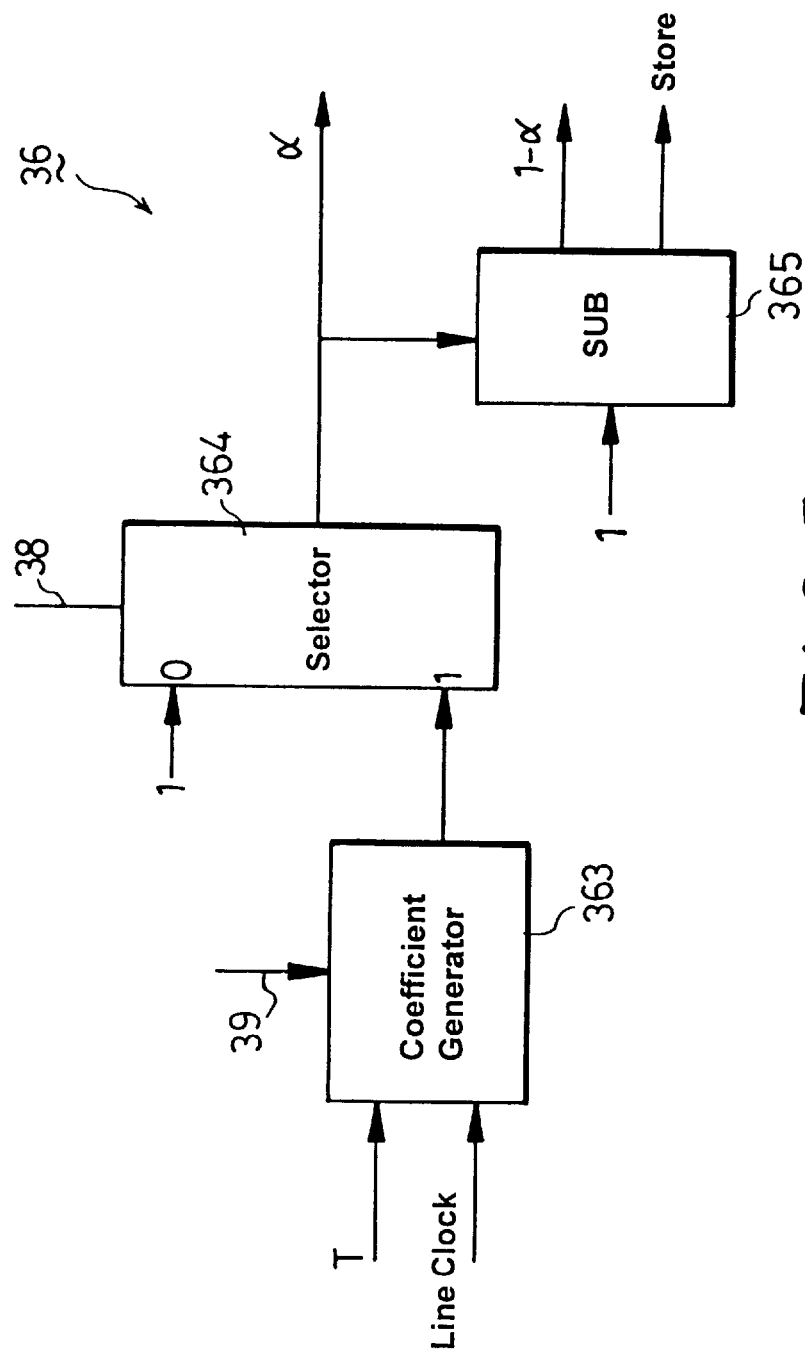
FIG. 5 is a schematic circuit block diagram of an alpha series generator of the vertical scaling controller.

Referring to FIG. 5, the alpha series generator 36 includes a coefficient generator 363 which is connected to the control output 39 of the computing circuit 44 and which receives the original input line clock and the quotient T from the first computing circuit 31. When the control output 39 is in a logic high state, the coefficient generator 363 generates consecutive 1, 1/(T+2), 2/(T+2), . . . (T+1)/(T+2) alpha coefficients respectively in consecutive (T+2) line clock periods, and when the control output 39 is in a logic low state, the coefficient generator 363 generates consecutive 1, 1/(T+1), 2/(T+1), . . . (T)/(T+1) alpha coefficients respectively in consecutive (T+1) line clock periods. A selector 364 has a first input fixed to 1, a second input that receives the output of the coefficient generator 363, and a control input that receives the INC/DEC flag 38. The output of the selector 364 is the coefficient α and serves as one of the inputs to a subtracting circuit 365. The other input of the subtracting circuit 365 is fixed to 1. One of the outputs of the subtracting circuit 365 is the coefficient 1-α. The other output of the subtracting circuit 365 is the store command signal for the line buffer 4 (see FIG. 1). The subtracting circuit 365 generates the store command signal when the coefficient 1-α is equal to zero, i.e. α=1.

Referring to FIG. 6, the address generator 37 includes a computing circuit 371 which outputs a quotient V resulting from the division of (N) by (N−▲N). The quotient V corresponds to an offset number between two selected scan lines of the digital image in the frame memory 2 when the digital image is scaled-down. The quotient V and the control output 39 serve as inputs to an adder 372. The output of the adder 372 serves as one of the inputs to a selector 373. The other input of the selector 373 is fixed to 1. The INC/DEC flag 38 serves as a control input of the selector 373. The selector 373 generates an offset number which is provided to an adder 374. The output of the adder 374 is connected to an address register 375. The output of the address register 375 is the line address data and, in turn, is received by the adder 374. The address register 375 has a Start input to preset a line address of the first one of the original scan lines stored in the frame memory 2. The address register 375 further has a load pin LD for controlling the storing of a next address therein.

A latch circuit 376 samples and holds the signal at the control output 39 according to the original input line clock. A clock modifying circuit 377 receives the original input line clock and modifies the latter in accordance with the output of the latch circuit 376 and the quotient T from the first computing circuit 31. When the output of the latch circuit 376 is in a logic high state, the clock modifying circuit 377 outputs a divide-by-(T+2) clock that has a duration of (T+2) times of the original input line clock, and when the output of the latch circuit 376 is in a logic low state, the clock modifying circuit 377 outputs a divide-by-(T+1) clock that has a duration of (T+1) times of the original input line clock. A selector 378 receives the original input line clock and the output of the clock modifying circuit 377, and is controlled by the INC/DEC flag 38 to output one of the inputs thereto as a clock input mClock2 that is received by the address register 375 at the load pin LD.

The structure of the horizontal scaling controller 10 is substantially similar to that of the vertical scaling controller 6 shown in FIGS. 3 to 6. Minor differences between the two controllers 6, 10 exist. For example, in the horizontal scaling controller 10, the first register of the programmable register set is used to store the number (N') of pixel data per original scan line of the digital image in the frame memory 2, and the second register is used to store the number (▲N') of pixel data to be interpolated or deleted per scan line. The third register stores an INC/DEC flag that is used to indicate whether scaling-up or scaling-down of the digital image in a horizontal direction is to be performed. The first computing circuit generates the quotient T' corresponding to the minimum number of interpolated pixel data to be inserted between every two pixel data of the scan line data from the bilinear adder 5. The second computing circuit generates the remainder S' corresponding to the total number of residual interpolated pixel data to be distributed uniformly among the pixel data of the scan line data from the bilinear adder 5 when the digital image is scaled-up. The third computing circuit generates the remainder U' corresponding to the total number of residual pixel data to be deleted from the scan line data from the bilinear adder 5 when the digital image is scaled-down. Instead of a store command signal, the alpha series generator of the horizontal scaling controller 10 generates a latch command signal for the dot buffer 8. The clock input to the address generator, the alpha series generator and the residue distributor is the original pixel clock. The original pixel clock may be the display dot clock such that the horizontal scaling operation can be achieved on the way the original image data is being outputted for display on the output device. The address output of the address register of the horizontal scaling controller 10 is a dot address that is used to control the line memory 3 and the line buffer 4. Thus, during scaling-up in a horizontal direction, all of the pixel data of (n)th and (n+1)th ones of the original scan lines and the interpolated scan lines therebetween, if any, pass through the bilinear adder 5. When scaling-down in both vertical and horizontal directions, only selected ones of the pixel data of the chosen ones of the original scan lines pass through the bilinear adder 5.

Thus, the preferred embodiment is operable to simultaneously perform scaling-up or scaling down in the vertical direction and scaling-up or scaling-down in the horizontal direction. The operation of the preferred embodiment will now be described in following paragraphs:

A. In order to facilitate explanation of the vertical scaling-up operation of the preferred embodiment, an example in which an original digital image with five original scan lines and five pixel data per scan line is scaled-up so as to obtain a desired digital image with seven desired scan lines and five pixel data per scan line is provided.

Referring to FIG. 3, the programmable register set 30 of the vertical scaling controller 6 is initially programmed by storing the number "5" in the first register 30a, the number "2" in the second register 30b, and a logic "1" in the third register 30c. The number "5" corresponds to the number (N) of original scan lines of the original digital image in the frame memory 2. The number "2" corresponds to the total number (▲N) of scan lines to be interpolated. The logic "1" in the third register 30c indicates that scaling-up of the original digital image in the vertical direction is to be performed. The programmable register set of the horizontal scaling controller 10 is then programmed to indicate that there are five pixel data in each of the original scan lines, that no pixel data is to be interpolated for each original scan line, and that scaling-up of the original digital image in a horizontal direction is to be performed.

The first computing circuit 31 outputs the quotient T resulting from the division of (▲N) by (N−1). Since (▲N) is less than (N−1), the quotient T is 0. The second computing circuit 32 outputs the remainder S resulting from the division of (▲N) by (N−1). In this example, the remainder S is equal to 2. The output of the third computing circuit 33 is irrelevant since the selector 34 provides the output of the second computing circuit 32 to the residue distributor 35 during the scale-up operation. The outputs of the first, second and third computing circuits of the horizontal scaling controller 10 are 0 since no horizontal scaling-up or scaling-down operation is to be performed.

Referring to FIG. 1 and to FIGS. 3 to 7, the address register 375 of the address generator 37 initially sets the line address of a first one of the original scan lines stored in the frame memory 2 and controls the frame memory 2 to provide the first one of the original scan lines to the line memory 3 during a starting line clock. At the same time, the remainder S is stored in the medial data register 56, and the adder 43 then adds the remainder S and the contents of the medial data register 56. Since the output of the adder 43, which is equal to 4 at this time, is less than the number (N), which is equal to 5, the control output 39 of the computing circuit 44 is at a low logic state. The selector 45 provides the output of the adder 43 to the medial data register 56, and the clock input mclock1 provided to the medial data register 56 is the divide-by-(T+1) clock, which is exactly the same as the original input line clock since the quotient T is equal to 0.

Because the control output 39 is at a low logic state, and since the quotient T is equal to 0, the coefficient generator 363 provides the number "1" to the selector 364. Since the INC/DEC flag 38 is at a logic "1", the selector 364 chooses the output of the coefficient generator 363 as the weighing coefficient α. Since the coefficient α is equal to 1, the coefficient 1-α is equal to 0, and the store command signal is generated so as to control the line buffer 4 to store the first one of the original scan lines from the line memory 3 therein. The output of the bilinear adder 5 at this stage is the first one of the original scan lines.

The selector 373 provides an offset number, which is equal to 1, to the adder 374. The adder 374 thus increments the output of the address register 375 by one unit when the next clock pulse mClock2 arrives, thereby controlling the frame memory 2 to provide a second one of the original scan lines to the line memory 3.

Upon arrival of the next clock pulse mClock1, the medial data register 56 stores the previous output of the adder 43, which is the number "4," therein. At this time, the output of the adder 43, which is now equal to 6, is larger than the number (N), which is equal to 5, such that the control output 39 of the computing circuit 44 is at a high logic state. The selector 45 provides the difference of the outputs of the adder 43 and the selector 41 to the medial data register 56, and the clock input mclock1 to the medial data register 56 is now the divide-by-(T+2) clock, the duration of which is twice the duration of the original input line clock.

Now that the control output 39 is at a high logic state, the coefficient generator 363 generates successively two outputs, 1 and ½ within one mclock1 pulse, that is, two consecutive original input line clocks. Within the first original input line clock, the bilinear adder 5 outputs the second one of the original scan lines and, at the same time, the latter is stored in the line buffer 4 since the coefficient α is equal to 1. Within the second original input line clock, the contents of the address register 375 are incremented by one unit upon reception of the next mClock2 pulse to control the frame memory 2 to provide a third one of the original scan lines to the line memory 3. At this time, the output of the coefficient generator 363 is equal to ½, the coefficient α is equal to ½, the coefficient 1-α is equal to ½, and no store command signal is generated. Thus, the second one of the original scan lines remains in the line buffer 4. The output of the bilinear adder 5 at this stage is the bilinear interpolation of the second and third ones of the original scan lines.

The contents of the medial data register 56 are updated so as to become 1, which is the difference of the output of the adder 43 and the number (N), when the next mclock1 pulse arrives. The output of the adder 43 is 3, which is less than the number (N), such that the control output 39 is at a low logic state. The selector 45 provides the output of the adder 43 to the medial data register 56, the clock input mclock1 provided to the medial data register 56 is the divide-by-(T+1) clock, and the coefficient α from the alpha series generator 36 is equal to 1. The output of the bilinear adder 5 is the third one of the original scan lines and, because the coefficient α is equal to 1, the third one of the original scan lines is stored in the line buffer 4.

The succeeding operation of the vertical scaling unit is similar to the foregoing until the fifth one of the original scan lines has been outputted by the bilinear adder 5.

Figure 7:
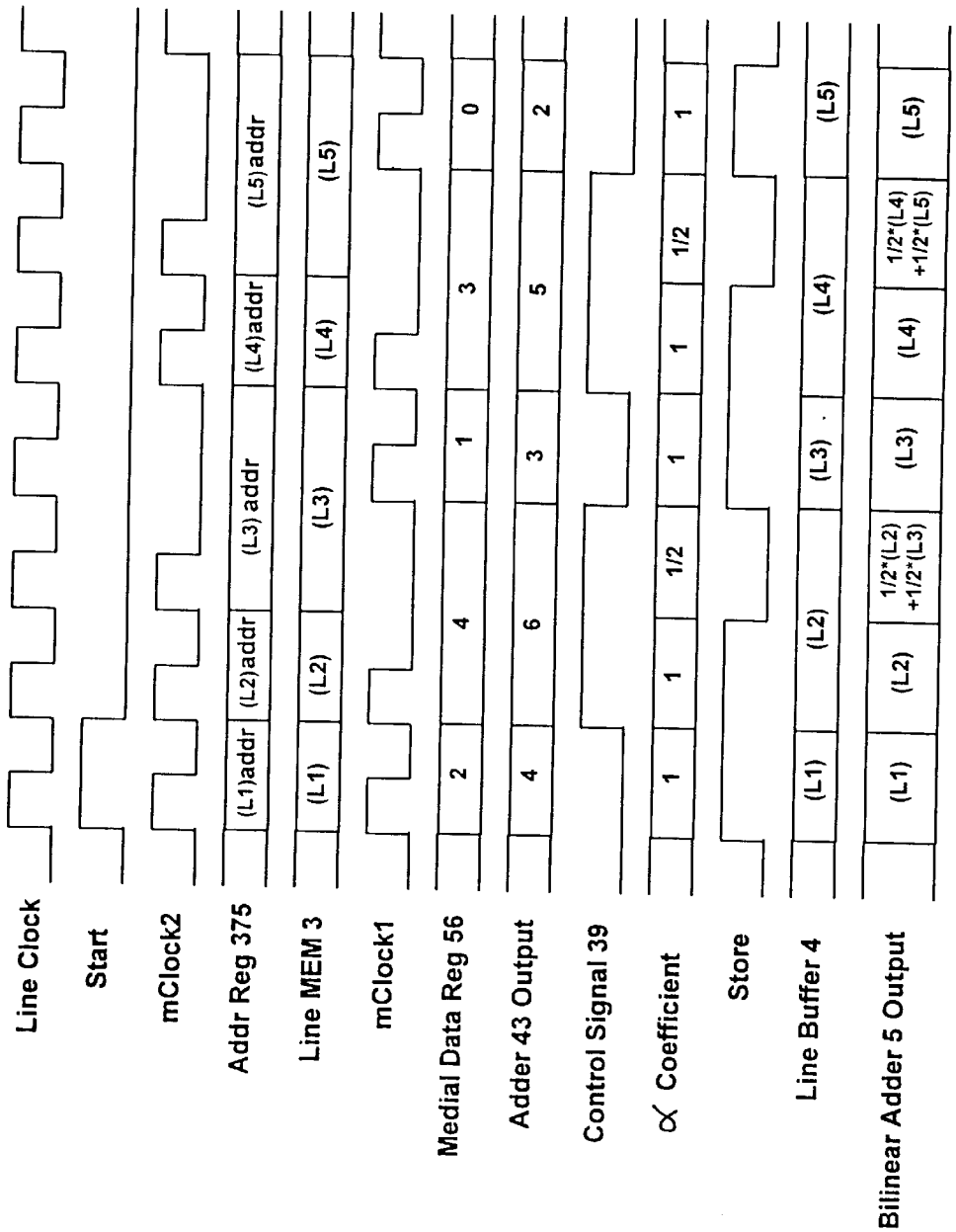
FIG. 7 is a timing diagram illustrating the vertical scaling-up operation of a vertical scaling unit of the preferred embodiment when N=5 and ▲N=2.

FIG. 7 is a timing diagram which illustrates the scaling-up operation of the preferred embodiment for this example, that is N=5 and ▲N=2.

It has thus been shown that the vertical scaling controller 6 controls the bilinear adder 5 to perform bilinear interpolation of an (n)th one of the original scan lines, which is stored in the line buffer 4, and an (n+1)th one of the original scan lines, which is stored in the line memory 3, so as to produce a residual interpolated scan line that is inserted between the (n)th and (n+1)th ones of the original scan lines when division of (▲N) by (n-1) results in a remainder (S), and when (n) is a minimum number that meets the condition $(n+1)*(S) \geq (s)*(N)$, wherein (s) ranges from 1 to (S).

Referring again to FIG. 1, since no horizontal scaling operation is to be performed, the horizontal scaling controller 10 controls the line memory 3 and the line buffer 4 to provide the pixel data stored therein sequentially to the bilinear adder 5. The original and interpolated pixel data from the bilinear adder 5 are received by the dot register 7 which, in turn, provides the same to the bilinear adder 9. At this time, the coefficient α is always equal to 1, and the output of the dot buffer 8 is disregarded by the bilinear adder 9. The output of the bilinear adder 9 is equal to that of the bilinear adder 5 and can be provided directly to the output device (not shown).

Figure 8:
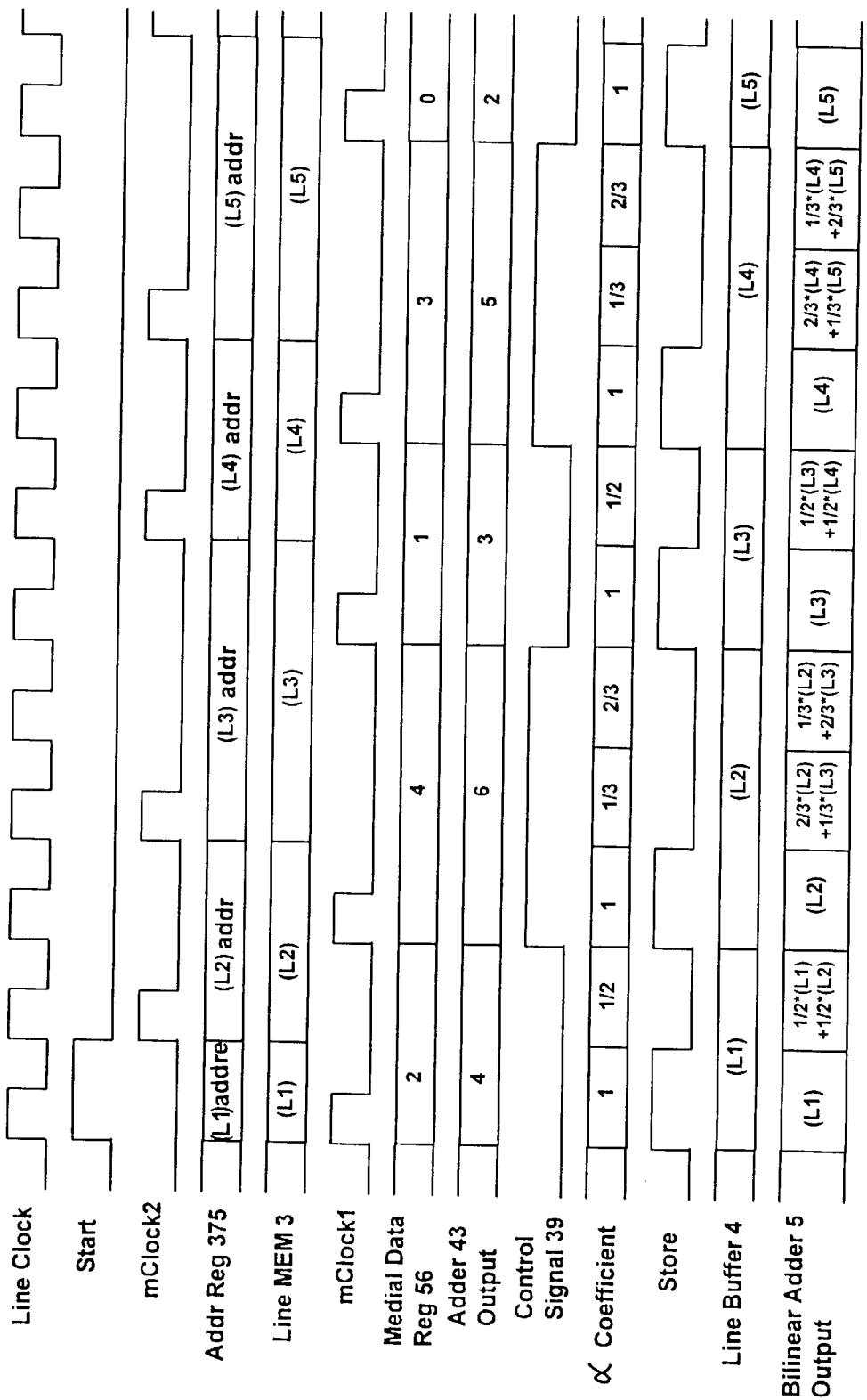
FIG. 8 is a timing diagram illustrating the vertical scaling-up operation of the vertical scaling unit when N=5 and ▲N=6.

In this example, the quotient (T) resulting from the division of (▲N) by (n-1) is 0. If the quotient T is not zero, that is, (▲N) is greater than or equal to (N-1), the vertical scaling controller 6 controls the bilinear adder 5 to perform bilinear interpolation of the (n)th and (n+1)th ones of the original scan lines so as to produce an additional number T of successive interpolated scan lines that are inserted between the (n)th and (n+1)th ones of the original scan lines. FIG. 8 illustrates a timing diagram of a sample vertical scaling-up operation performed by the preferred embodiment when N=5 and ▲N=6. In this example, the quotient T is equal to 1, and the remainder S is equal to 2. Obviously, there is an additional interpolated scan line inserted between every interval of the (n)th and (n+1)th ones of the original scan lines.

B. In the following example, an original digital image with five original scan lines and five pixel data per scan line is scaled-down so as to obtain a desired digital image with three desired scan lines and five pixel data per scan line.

Referring again to FIG. 3, the programmable register set 30 is initially programmed by storing the number "5" in the first register 30a, the number "2" in the second register 30b, and a logic "0" in the third register 30c. The number "5" corresponds to the number (N) of original scan lines of the original digital image in the frame memory 2. The number "2" corresponds to the total number (▲N) of scan lines to be deleted. The logic "0" in the third register 30c indicates that scaling-down of the original digital image is to be performed. The programmable register set of the horizontal scaling controller 10 is then programmed to indicate that there are five pixel data in each of the original scan lines, that no pixel data is to be interpolated for each original scan line, and that scaling-up of the original digital image in a horizontal direction is to be performed.

The outputs of the first and second computing circuits 31, 32 are irrelevant during the scale-down operation. The third computing circuit 33 outputs the remainder U resulting from the division of (N) by (N-▲N), (N-▲N) being the number of original scan lines to be retained. In this example, the remainder U is equal to 2. The selector 34 provides the output of the third computing circuit 33 to the residue distributor 35.

Figure 9:
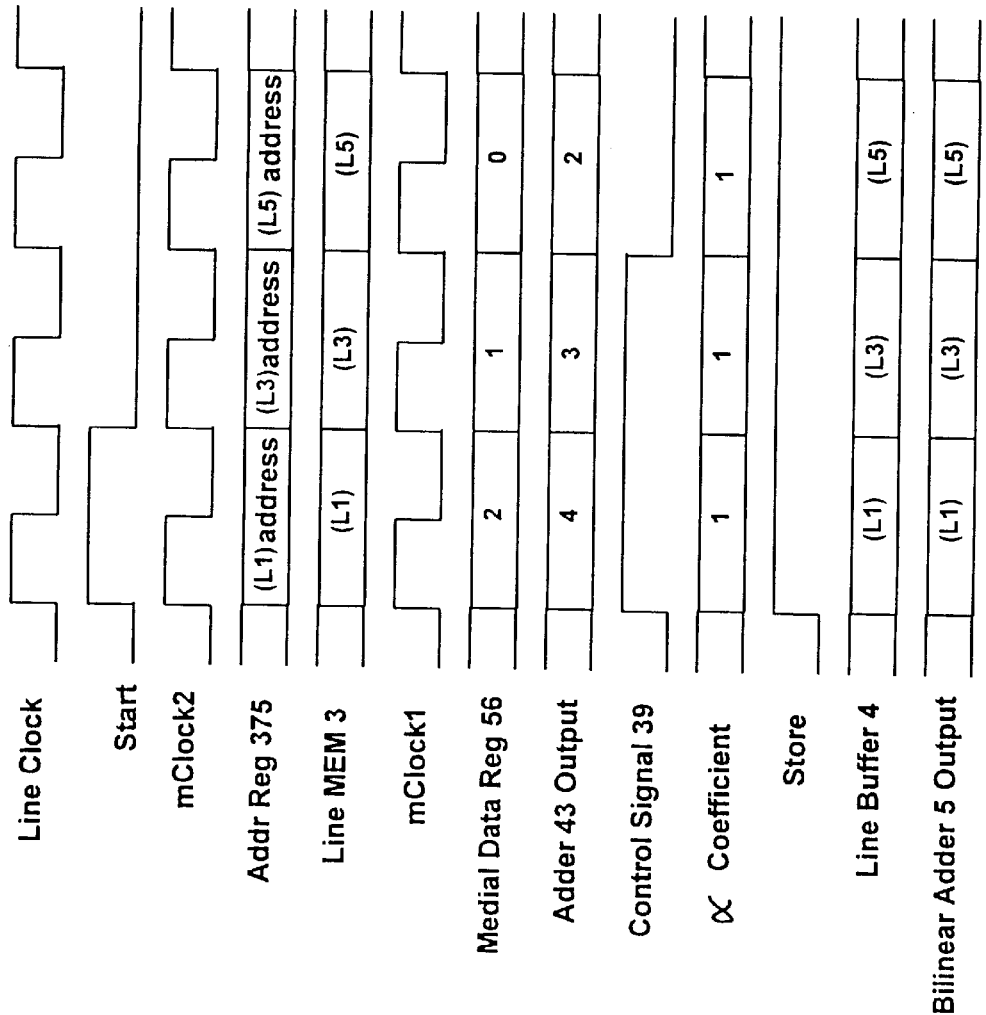
FIG. 9 is a timing diagram illustrating the vertical scaling-down operation of the vertical scaling unit when N=5 and ▲N=2.

Referring to FIG. 1, FIGS. 3 to 6, and to FIG. 9, the address register 375 of the address generator 37 initially sets the line address of a first one of the original scan lines stored in the frame memory 2 and controls the frame memory 2 to provide the first one of the original scan lines to the line memory 3 during a starting line clock. At the same time, the remainder U is stored in the medial data register 56, and the adder 43 then adds the remainder U and the contents of the medial data register 56. The computing circuit 44 subtracts the number (N−▲N) from the selector 41 from the output of the adder 43. Since the output of the adder 43, which is equal to 4 at this time, is greater than the number (N−▲N), which is equal to 3, the control output 39 of the computing circuit 44 is in a high logic state. The selector 45 provides the difference of the outputs of the adder 43 and the selector 41 to the medial data register 56. The original line clock is supplied to the medial data register 56 via the selector 47.

Referring to FIGS. 3 and 5, because a logic "0" is stored in the third register 30c, the selector 364 maintains the coefficient α at 1. The coefficient 1-α is thus equal to 0, and the store command signal is always generated so as to activate the line buffer 4 to store continuously an original scan line from the line memory 3 therein. In addition, the output of the bilinear adder 5 is always the output of the line memory 3.

Referring to FIG. 6, the computing circuit 371 outputs the quotient V resulting from the division of (N) by (N−▲N). In this example, the quotient V is equal to 1. The adder 372 generates the sum of the quotient V and the logic state of the control output 39, which is currently at a high logic state. The selector 373 chooses the output of the adder 372, which is equal to 2, and provides the same to the adder 374. Thus, the output of the address register 375 is incremented by two units when the next mClock2 pulse arrives, thereby controlling the frame memory 2 to provide the third one of the original scan lines to the line memory 3.

Referring again to FIG. 4, upon arrival of the next line clock pulse, the medial data register 56 stores the number "1," which is the previous difference computed by the computing circuit 44, therein. At this time, the output of the adder 43, which is equal to 3, is equal to the output of the selector 41. The control output 39 of the computing circuit 44 is at a high logic state, and the selector 45 provides the difference of the outputs of the adder 43 and the selector 41 to the medial data register 56.

Referring again to FIG. 6, the adder 372 once more generates the sum of the quotient V and the current logic state of the control output 39. The output of the adder 372, which is equal to 2, is provided to the adder 374 via the selector 373. Thus, the output of the address register 375 is again incremented by two units when the next mClock2 pulse arrives, thereby controlling the frame memory 2 to provide the fifth one of the original scan lines to the line memory 3. FIG. 9 is a timing diagram which illustrates the vertical scaling-down operation of the preferred embodiment for this example, that is N=5 and ▲N=2. The operation of the horizontal scaling unit for this example is similar to that described beforehand and will not be repeated herein.

From the foregoing, it has been shown that the address generator 37 of the vertical scaling controller 6 controls the frame memory 2 to output only chosen ones of the original scan lines. The original scan lines which were not outputted by the frame memory 2 are, in effect, discarded. It is noted that the original scan line to be outputted by the frame memory 2 is offset from an immediately preceding original scan line that was outputted by the latter by the number V when the output of the adder 43 of the residue distributor 35 is less than the difference (N−▲N), and by the number (V+1) when the output of the adder 43 is at least equal to the difference (N−▲N).

C. In the following explanation of the horizontal scaling-up operation of the preferred embodiment, an example in which an original digital image with five original scan lines and five pixel data per scan line is scaled-up so as to obtain a desired digital image with five desired scan lines and seven pixel data per scan line is provided.

The programmable register set 30 of the vertical scaling controller 6 is initially programmed to indicate that there are five original scan lines in the frame memory 2, that no scan line is to be interpolated, and that scaling-up of the original digital image in a vertical direction is to be performed. The programmable register set of the horizontal scaling controller 10 is then programmed by storing the number "5" in the first register, the number "2" in the second register, and a logic "1" in the third register. The number "5" corresponds to the number (N') of pixel data in each of the original scan lines in the frame memory 2. The number "2" corresponds to the total number (▲N') of pixel data to be interpolated per scan line. The logic "1" in the third register indicates that scaling-up of the original digital image in the horizontal direction is to be performed.

The outputs of the first, second and third computing circuits 31, 32, 33 of the vertical scaling controller 6 are 0 since no vertical scaling-up or scaling-down operation is to be performed. The first computing circuit of the horizontal scaling controller 10 outputs the quotient T' resulting from the division of (▲N') by (N'−1). Since (▲N') is less than (N'−1), the quotient T' is 0. The second computing circuit of the horizontal scaling controller 10 outputs the remainder S' resulting from the division of (▲N') by (N'−1). In this example, the remainder S' is equal to 2. The output of the third computing circuit of the horizontal scaling controller 10 is irrelevant since the output of the second computing circuit is provided to the residue distributor during the horizontal scale-up operation.

Since no vertical scaling operation is to be performed, the vertical scaling controller 6 controls the frame memory 2 to provide the original scan lines to the line memory 3 in sequence. The horizontal scaling controller 10 controls the line memory 3 and the line buffer 4 to provide the pixel data stored therein sequentially to the bilinear adder 5. At this time, the coefficient α from the vertical scaling controller 6 is always equal to 1, and the output of the line buffer 4 is disregarded by the bilinear adder 5. The output of the bilinear adder 5 is equal to that of the line memory 3.

As mentioned beforehand, the scaling-up operation of the horizontal scaling unit is substantially similar to that of the vertical scaling unit. However, unlike the vertical scaling controller 6, the horizontal scaling controller 10 controls the bilinear adder 9 to perform bilinear interpolation of an (n')th one of the original pixel data, which is stored in the dot buffer 8, and an (n'+1)th one of the original pixel data, which is stored in the dot register 7, so as to produce a residual interpolated pixel data that is inserted between the (n')th and (n'+1)th ones of the original pixel data when division of (▲N') by (N'−1) results in a remainder (S'), and when (n') is a minimum number that meets the condition (n'+1)*(S')≧ (s')*(N'), wherein (s') ranges from 1 to (S'). Thus, with (N'), (▲N') and (S') equal to 5, 2 and 2, respectively, residual interpolated pixel data is to be inserted between the second and third original pixel data and between the fourth and fifth original pixel data of one scan line.

The horizontal scaling controller 10 initially sets the dot address of a first one of the pixel data of the scan line data stored in the line memory 3 and controls the line memory 3 to provide the first one of the pixel data to the bilinear adder 5 so as to be received by the dot register 7 during a starting pixel clock. The coefficient α from the horizontal scaling controller 10 is equal to 1, and the latch command signal is generated so as to control the dot buffer 8 to store the first one of the original pixel data from the dot register 7 therein. The output of the bilinear adder 9 at this stage is the first one of the original pixel data and may be provided directly to the output device (not shown).

At this time, the horizontal scaling controller 10 controls the line memory 3 to provide a second one of the original pixel data to the bilinear adder 5 for reception by the dot register 7. The horizontal scaling controller 10 generates successively two α coefficients, 1 and ½, within two consecutive original pixel clocks. Within the first original pixel clock, the bilinear adder 9 outputs the second one of the original pixel data and, at the same time, the latter is stored in the dot buffer 8 since the coefficient α is equal to 1. Within the second original pixel clock, the line memory 3 provides a third one of the original pixel data to the bilinear adder 5 for reception by the dot register 7. The coefficient α is now equal to ½, and the second one of the original pixel data remains in the dot buffer 8. The output of the bilinear adder 9 at this stage is the bilinear interpolation of the second and third ones of the original pixel data.

During the next original pixel clock, the coefficient α from the horizontal scaling controller 10 reverts to 1, and the output of the bilinear adder 9 is the third one of the original pixel data which is simultaneously stored in the dot buffer 8.

The succeeding operation of the horizontal scaling unit is similar to the foregoing until the fifth one of the original pixel data of one scan line has been outputted by the bilinear adder 9.

Figure 10:
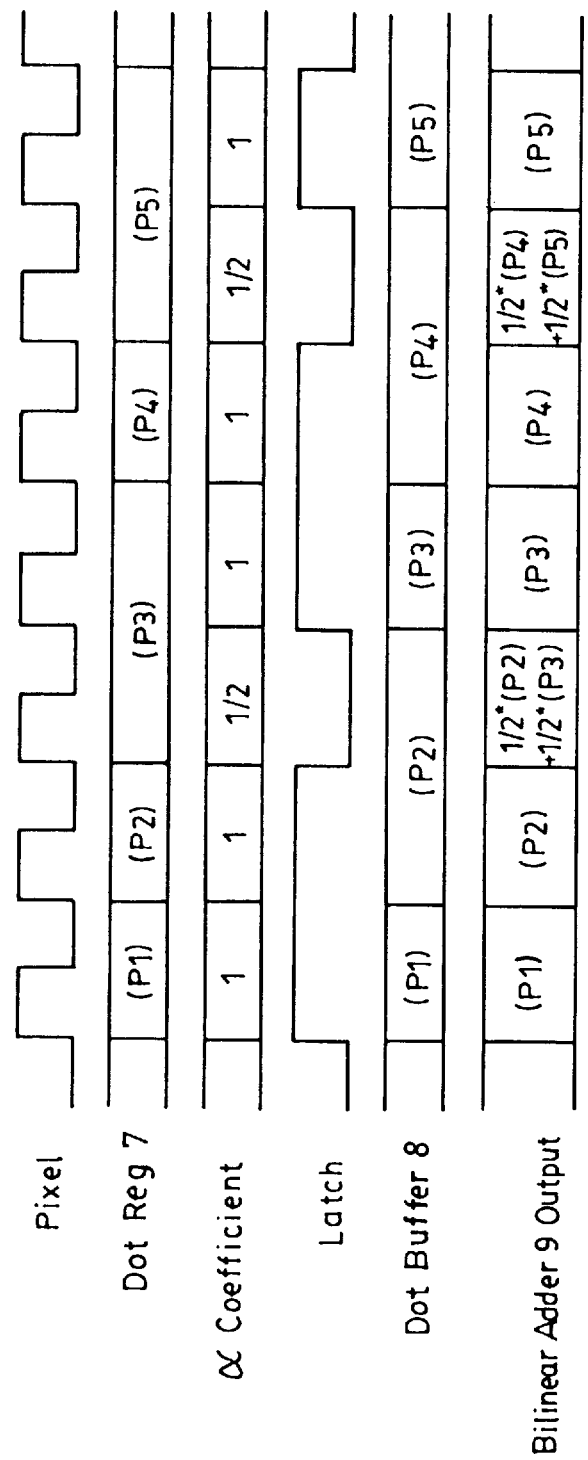
FIG. 10 is a timing diagram illustrating the horizontal scaling-up operation of a horizontal scaling unit of the preferred embodiment when N'=5 and ▲N'=2.

FIG. 10 is a timing diagram which illustrates the horizontal scaling-up operation of the preferred embodiment for this example, that is N'=5 and ▲N'=2.

In this example, the quotient (T') resulting from the division of (▲N') by (N'−1) is 0. If the quotient T' is not zero, that is, (▲N') is greater than or equal to (N'−1), the horizontal scaling controller 10 controls the bilinear adder 9 to perform bilinear interpolation of the (n')th and (n'+1)th ones of the original pixel data of one scan line so as to produce an additional number T' of successive interpolated pixel data that are inserted between the (n')th and (n'+1)th ones of the original pixel data.

D. In the following example, an original digital image with five original scan lines and five pixel data per scan line is scaled-down so as to obtain a desired digital image with five desired scan lines and three pixel data per scan line.

The programmable register set 30 of the vertical scaling controller 6 is initially programmed to indicate that there are five original scan lines in the frame memory 2, that no scan line is to be interpolated, and that scaling-up of the original digital image in a vertical direction is to be performed. The programmable register set of the horizontal scaling controller 10 is then programmed by storing the number "5" in the first register, the number "2" in the second register, and a logic "0" in the third register. The number "5" corresponds to the number (N') of pixel data per original scan line of the digital image in the frame memory 2. The number "2" corresponds to the total number (▲N') of pixel data to be deleted per scan line. The logic "0" in the third register indicates that scaling-down of the original digital image in the horizontal direction is to be performed.

The outputs of the first, second and third computing circuits 31, 32, 33 of the vertical scaling controller 6 are 0 since no vertical scaling-up or scaling-down operation is to be performed. Thus, the vertical scaling controller 6 controls the frame memory 2 to provide the original scan lines to the line memory 3 in sequence. The horizontal scaling controller 10 controls the line memory 3 and the line buffer 4 to provide selected ones of the pixel data stored therein to the bilinear adder 5. For this example, the coefficient α from the vertical scaling controller 6 is always equal to 1, and the output of the line buffer 4 is disregarded by the bilinear adder 5. The output of the bilinear adder 5 is equal to the output of the line memory 3.

The scaling-down operation of the horizontal scaling unit is substantially similar to that of the vertical scaling unit. However, in the horizontal scaling unit, the horizontal scaling controller 10 controls the line memory 3 and the line buffer 4 to output only chosen ones of the original pixel data. The original pixel data to be outputted by the line memory 3 and the line buffer 4 is offset from an immediately preceding original pixel data that was outputted by the latter by the number V', which is the quotient of (N') divided by (N'−▲N'), when the output of an adder of the residue distributor of the horizontal scaling controller 10 is less than the difference (N'−▲N'), and by the number (V'+1) when otherwise.

The outputs of the first and second computing circuits of the horizontal scaling controller 10 are irrelevant during the horizontal scale-down operation. The third computing circuit outputs the remainder U' resulting from the division of (N') by (N'−▲N'), (N'31 ▲N') being the number of original pixel data to be retained per scan line. In this example, the remainder U', is equal to 2 and is provided to the residue distributor of the horizontal scaling controller 10.

The horizontal scaling controller 10 initially sets the dot address of a first one of the pixel data of a scan line data stored in the line memory 3, and controls the line memory 3 to provide the first one of the pixel data to the bilinear adder 5 during a starting pixel clock. Because a logic "0" is stored in the third register of the horizontal scaling controller 10, the coefficient α from the horizontal scaling controller 10 is maintained at 1. Thus, the dot buffer 8 is activated to store continuously pixel data from the dot register 7 therein, and the output of the bilinear adder 9 is always the output of the dot register 7.

At this time, the output of the adder of the residue distributor of the horizontal scaling controller 10 is greater than the difference (N'−▲N'), thereby resulting in an offset number (V'+1) or 2. The horizontal scaling controller 10 controls the line memory 3 and the line buffer 4 to provide the third one of the pixel data of the scan line data stored therein to the bilinear adder 5 for reception by the dot register 7.

Upon arrival of the next pixel clock pulse, the output of the adder of the residue distributor of the horizontal scaling controller 10 is equal to the difference (N'−▲N'), thereby resulting in an offset number (V'+1) or 2. The horizontal scaling controller 10 controls the line memory 3 and the line buffer 4 to provide the fifth one of the pixel data of the scan line data stored therein to the bilinear adder 5 for reception by the dot register 7.

Figure 11:
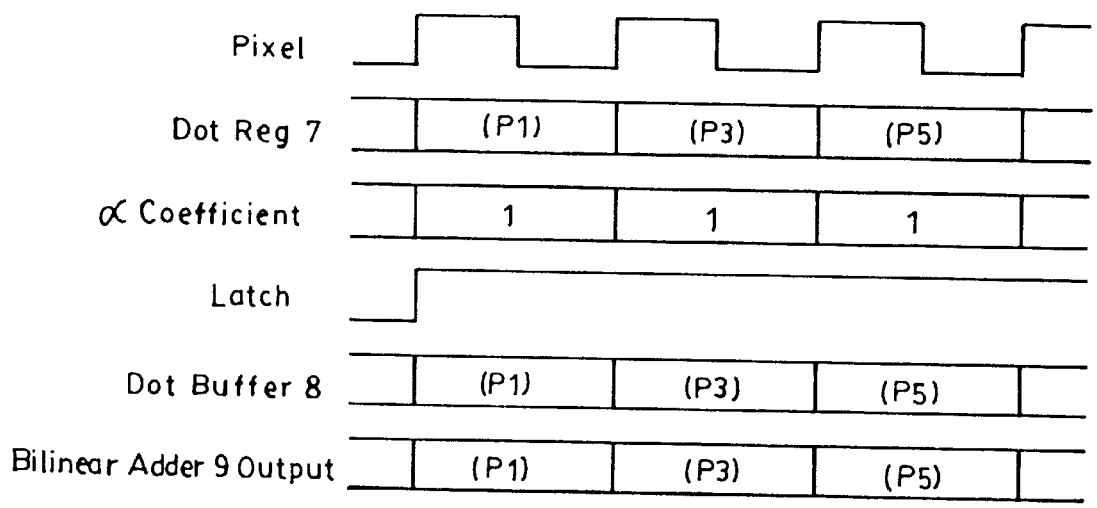
FIG. 11 is a timing diagram illustrating the horizontal scaling-down operation of the horizontal scaling unit when N'=5 and ▲N'=2.

FIG. 11 is a timing diagram which illustrates the horizontal scaling-down operation of the preferred embodiment for this example, that is N'=5 and ▲N'=2.

The apparatus of the present invention is a dedicated hardware device which permits real-time two-dimensional scaling of digital images. In addition, the apparatus of the present invention is relatively inexpensive in view of its relatively small memory requirement regardless of the scaling ratio and employs less processing stages, thereby resulting in higher efficiency, since the output of the vertical scaling unit is provided directly to the horizontal scaling unit without the need for storing the same in an intermediate frame buffer, and since the output of the horizontal scaling unit can be provided directly to an output device without the need for storing said output in an output frame buffer. The present invention is thus ideal for use in live video applications.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. An apparatus for processing an original digital image to obtain a uniformly scaled desired digital image, the apparatus including a frame memory for storing the original digital image therein, the original digital image having a number (N) of successive original scan lines and a number (N') of successive original pixel data per original scan line, the apparatus further including a vertical scaling unit for scaling the original digital image in a vertical direction to obtain a number (M) of successive desired scan lines, and a horizontal scaling unit for scaling the desired scan lines from the vertical scaling unit in a horizontal direction to obtain a number (M') of successive desired pixel data per scan line, the number (M) being greater than the number (N), the number (M') being greater than the number (N'), wherein:

the vertical scaling unit includes: a line memory connected to the frame memory for storing an (n+1)th one of the original scan lines from the frame memory therein; a line buffer connected to the line memory for storing an (n)th one of the original scan lines therein; a first linear interpolator connected to the line memory and the line buffer; and a vertical scaling controller connected to the frame memory, the line buffer and the first linear interpolator, the vertical scaling controller controlling the storage of the original scan lines in the line memory and the line buffer, the vertical scaling controller further controlling the first linear interpolator to perform a linear interpolation of the (n)th and (n+1)th ones of the original scan lines from the line memory and the line buffer to produce a residual interpolated scan line inserted therebetween when division of (M−N) by (N−1) results in a remainder (S) and when (n) is a minimum number which meets a condition (n+1)*(S)≧(s)*(N), wherein (s) ranges from 1 to (S); and the horizontal scaling unit includes: a dot register connected to the first linear interpolator for storing an (n'+1)th one of the pixel data of one of the scan lines from the first linear interpolator therein; a dot buffer connected to the dot register for storing an (n')th one of the pixel data of said one of the scan lines therein; a second linear interpolator connected to the dot register and the dot buffer; and a horizontal scaling controller connected to the line memory, the line buffer, the dot buffer and the second linear interpolator, the horizontal scaling controller controlling the storage of the pixel data in the dot register and the dot buffer, the horizontal scaling controller further controlling the second linear interpolator to perform a linear interpolation of the (n')th and (n'+1)th ones of the pixel data from the dot register and the dot buffer to produce a residual interpolated pixel data inserted therebetween when division of (M'−N') by (N'−1) results in a remainder (S') and when (n') is a minimum number which meets a condition (n'+1)*(S')≧(s')*(N'), wherein (s') ranges from 1 to (S');

whereby the output of the second linear interpolator can be provided directly to an output device.

2. The apparatus as claimed in claim 1, wherein the vertical scaling controller further controls the first linear interpolator to perform a linear interpolation of the (n)th and (n+1)th ones of the original scan lines to produce an additional number (T) of successive interpolated scan lines inserted therebetween when (M−N) is larger than (n−1), the number (T) being equal to a quotient resulting from the division of (M−N) by (N−1).

3. The apparatus as claimed in claim 2, wherein the first linear interpolator is a bilinear adder.

4. The apparatus as claimed in claim 1, wherein the horizontal scaling controller further controls the second linear interpolator to perform a linear interpolation of the (n')th and (n'+1)th ones of the pixel data of said one of the scan lines from the first linear interpolator to produce an additional number (T') of successive interpolated pixel data inserted therebetween when (M'−N') is larger than (N'−1), the number (T') being equal to a quotient resulting from the division of (M'−N') by (N'−1).

5. The apparatus as claimed in claim 4, wherein the second linear interpolator is a bilinear adder.

6. The apparatus of claim 1, wherein the number M' is equal to the number N'.

7. An apparatus for processing an original digital image to obtain a uniformly scaled desired digital image, the apparatus including a frame memory for storing the original digital image therein, the original digital image having a number (N) of successive original scan lines and a number (N') of successive original pixel data per original scan line, the apparatus further including a vertical scaling unit for scaling the original digital image in a vertical direction to obtain a number (M) of successive desired scan lines, and a horizontal scaling unit for scaling the desired scan lines from the vertical scaling unit in a horizontal direction to obtain a number (M') of successive desired pixel data per scan line, the number (M) being greater than the number (N), the number (M') being less than the number (N'), wherein:

the vertical scaling unit includes: a line memory connected to the frame memory for storing an (n+1)th one of the original scan lines from the frame memory therein; a line buffer connected to the line memory for storing an (n)th one of the original scan lines therein; a linear interpolator connected to the line memory and the line buffer; and a vertical scaling controller connected to the frame memory, the line buffer and the linear interpolator, the vertical scaling controller controlling the storage of the original scan lines in the line memory and the line buffer, the vertical scaling controller further controlling the linear interpolator to perform a linear interpolation of the (n)th and (n+1)th ones of the original scan lines from the line memory and the line buffer to produce a residual interpolated scan line inserted therebetween when division of (M−N) by (n−1) results in a remainder (S) and when (n) is a minimum number which meets a condition (n+1)*(S)≧(s)*(N) wherein (s) ranges from 1 to (S); and the horizontal scaling unit includes a horizontal scaling controller, the horizontal scaling controller including:

an address generator, connected to the line memory and the line buffer, for controlling the line memory and the line buffer to output a first one of the original pixel data of one of the scan lines;

generating means for generating a number (U'), which is a remainder that results from division of the number (N') by the number (M');

a data register;

adder means, connected to the generating means and the data register, for adding the number (U') and the number stored in the data register to obtain a sum; and computing means, connected to the adder means, the address generator and the data register, for comparing the sum with the number (M') and for activating the address generator to control the line memory and the line buffer to output another one of the original pixel data of said one of the scan lines, said another one of the original pixel data of said one of the scan lines being offset from an immediately preceding original pixel data outputted by the line memory and the line buffer by a number (V') equal to a quotient that results from the division of the number (N') by the number (M') when the sum is less than the number (M'), and by a number (V'+1) when the sum is at least equal to the number (M');

the computing means storing difference of the number (M') and the sum in the data register when the sum is at least equal to the number (M'), and storing the sum in the data register when the sum is less than the number (M');

whereby the output of the horizontal scaling unit can be provided directly to an output device.

8. The apparatus as claimed in claim 7, wherein the vertical scaling controller further controls the linear interpolator to perform a linear interpolation of the (n)th and (n+1)th ones of the original scan lines to produce an additional number (T) of successive interpolated scan lines inserted therebetween when (M− N) is larger than (n−1), the number (T) being equal to a quotient resulting from the division of (M−N) by (N−1).

9. The apparatus as claimed in claim 8, wherein the linear interpolator is a bilinear adder.

10. The apparatus of claim 7, wherein the number M is equal to the number N.

11. An apparatus for processing an original digital image to obtain a uniformly scaled desired digital image, the apparatus including a frame memory for storing the original digital image therein, the original digital image having a number (N) of successive original scan lines and a number (N') of successive original pixel data per original scan line, the apparatus further including a vertical scaling unit for scaling the original digital image in a vertical direction to obtain a number (M) of successive desired scan lines, and a horizontal scaling unit for scaling the desired scan lines from the vertical scaling unit in a horizontal direction to obtain a number (M') of successive desired pixel data per scan line, the number (M) being less than the number (N), the number (M') being greater than the number (N'), wherein:

the vertical scaling unit includes a vertical scaling controller and a line memory connected to the frame memory, the vertical scaling controller including:

an address generator, connected to the frame memory, for controlling the frame memory to output a first one of the original scan lines for storage in the line memory;

generating means for generating a number (U), which is a remainder that results from division of the number (N) by the number (M);

a data register;

adder means, connected to the generating means and the data register, for adding the number (U) and the number stored in the data register to obtain a sum; and computing means, connected to the adder means, the address generator and the data register, for comparing the sum with the number (M) and for activating the address generator to control the frame memory to output another one of the original scan lines for storage in the line memory, said another one of the original scan lines being offset from an immediately preceding original scan line outputted by the frame memory by a number (V) equal to a quotient that results from the division of the number (N) by the number (M) when the sum is less than the number (M), and by a number (V+1) when the sum is at least equal to the number (M);

the computing means storing difference of the number (M) and the sum in the data register when the sum is at least equal to the number (M), and storing the sum in the data register when the sum is less than the number (M); and the horizontal scaling unit includes: a dot register connected to the line memory for storing an (n'+1)th one of the pixel data of one of the scan lines from the line memory therein; a dot buffer connected to the dot register for storing an (n')th one of the pixel data of said one of the scan lines from the line memory therein; a linear interpolator connected to the dot register and the dot buffer; and a horizontal scaling controller connected to the line memory, the dot buffer and the linear interpolator, the horizontal scaling controller controlling the storage of the pixel data in the dot register and the dot buffer, the horizontal scaling controller further controlling the linear interpolator to perform a linear interpolation of the (n')th and (n'+1)th ones of the pixel data from the dot register and the dot buffer to produce a residual interpolated pixel data inserted therebetween when division of (M'−N') by (N'−1) results in a remainder (S') and when (n') is a minimum number which meets a condition (n'+1)*(S')≧(s')*(N'), wherein (s') ranges from 1 to (S');

whereby the output of the linear interpolator can be provided directly to an output device.

12. The apparatus as claimed in claim 11, wherein the horizontal scaling controller further controls the linear interpolator to perform a linear interpolation of the (n')th and (n'+1)th ones of the pixel data of said one of the scan lines from the line memory to produce an additional number (T') of successive interpolated pixel data inserted therebetween when (M'−N') is larger than (N'−1), the number (T') being equal to a quotient resulting from the division of (M'−N') by (N'−1).

13. The apparatus as claimed in claim 12, wherein the linear interpolator is a bilinear adder.

14. The apparatus of claim 11, wherein the number of M is equal to the number N.

15. An apparatus for processing an original digital image to obtain a uniformly scaled desired digital image, the apparatus including a frame memory for storing the original digital image therein, the original digital image having a number (N) of successive original scan lines and a number (N') of successive original pixel data per original scan line, the apparatus further including a vertical scaling unit for scaling the original digital image in a vertical direction to obtain a number (M) of successive desired scan lines, and a horizontal scaling unit for scaling the desired scan lines from the vertical scaling unit in a horizontal direction to obtain a number (M') of successive desired pixel data per scan line, the number (M) being less than the number (N), the number (M') being less than the number (N'), wherein:

the vertical scaling unit includes a vertical scaling controller and a line memory connected to the frame memory, the vertical scaling controller including:

a first address generator, connected to the frame memory, for controlling the frame memory to output a first one of the original scan lines for storage in the line memory;

first generating means for generating a number (U), which is a remainder that results from division of the number (N) by the number (M);

a first data register;

first adder means, connected to the first generating means and the first data register, for adding the number (U) and the number stored in the first data register to obtain a sum; and first computing means, connected to the first adder means, the first address generator and the first data register, for comparing the sum with the number (M) and for activating the first address generator to control the frame memory to output another one of the original scan lines for storage in the line memory, said another one of the original scan lines being offset from an immediately preceding original scan line outputted by the frame memory by a number (V) equal to a quotient that results from the division of the number (N) by the number (M) when the sum is less than the number (M), and by a number (V+1) when the sum is at least equal to the number (M);

the first computing means storing difference of the number (M) and the sum in the first data register when the sum is at least equal to the number (M), and storing the sum in the first data register when the sum is less than the number (M); and the horizontal scaling unit includes a horizontal scaling controller, the horizontal scaling controller including:

a second address generator, connected to the line memory, for controlling the line memory to output a first one of the original pixel data of one of the original scan lines;

second generating means for generating a number (U'), which is a remainder that results from division of the number (N') by the number (M');

a second data register;

second adder means, connected to the second generating means and the second data register, for adding the number (U') and the number stored in the second data register to obtain a sum; and second computing means, connected to the second adder means, the second address generator and the second data register, for comparing the sum with the number (M') and for activating the second address generator to control the line memory to output another one of the original pixel data of said one of the original scan lines, said another one of the original pixel data of said one of the original scan lines being offset from an immediately preceding original pixel data outputted by the line memory by a number (V') equal to a quotient that results from the division of the number (N') by the number (M') when the sum is less than the number (M'), and by a number (V'+1) when the sum is at least equal to the number (M');

the second computing means storing difference of the number (M') and the sum in the second data register when the sum is at least equal to the number (M'), and storing the sum in the second data register when the sum is less than the number (M');

whereby the output of the horizontal scaling unit can be provided directly to an output device.

16. The apparatus of claim 15, wherein the number M' is equal to the number N'.

\* \* \* \* \*

UNITED STATES PATENT AND TRADEMARK OFFICE
CERTIFICATE OF CORRECTION

PATENT NO.    : 5,825,367
DATED         : October 20, 1998
INVENTOR(S)   : R.-F. Shyu et al.

It is certified that error appears in the above-indentified patent and that said Letters Patent is hereby corrected as shown below:

| COLUMN | LINE | |
|---|---|---|
| [75] Pg. 1, col. 1 | Inventors | "Hsinchu;" should read --Hsinchu City;-- |
| [73] Pg. 1, col. 1 | Assignee | "Hsinchu," should read --Hsinchu City,-- |
| [56] Pg. 1, col. 2 | Refs. Cited (Foreign Pats., item 3) | "0 367 418 A2   5/1990   WIPO" should read --0 367 418 A2   5/1990   European Pat. Off.-- |
| 16 (Claim 2, | 13 line 6) | "(n-1)," should read --(N-1),-- |
| 16 (Claim 7, | 61 line 31) | "(n-1)" should read --(N-1)-- |
| 16 (Claim 7, | 63 line 33) | After "(N)" insert --,-- |
| 17 (Claim 8, | 37 line 6) | "(n-1)," should read --(N-1),-- |
| 18 (Claim 11, | 6 line 30) | Indent once further the paragraph beginning with "computing means, . . ." and ending with "(M);" |

UNITED STATES PATENT AND TRADEMARK OFFICE
CERTIFICATE OF CORRECTION

PATENT NO. : 5,825,367
DATED : October 20, 1998
INVENTOR(S) : R.-F. Shyu et al.

It is certified that error appears in the above-indentified patent and that said Letters Patent is hereby corrected as shown below:

COLUMN      LINE

18      56      After "number" delete "of"
(Claim 14, line 1)

Signed and Sealed this

Seventeenth Day of August, 1999

Attest:

Q. TODD DICKINSON

Attesting Officer    Acting Commissioner of Patents and Trademarks